(12) United States Patent
Branz et al.

(10) Patent No.: US 6,441,942 B1
(45) Date of Patent: Aug. 27, 2002

(54) ELECTROCHROMIC PROJECTION AND WRITING DEVICE

(75) Inventors: Howard M. Branz, Boulder; David K. Benson, Golden, both of CO (US)

(73) Assignee: Midwest Research Institute, Kansas City, MO (US)

( * ) Notice: Subject to any disclaimer, the term of this patent is extended or adjusted under 35 U.S.C. 154(b) by 0 days.

(21) Appl. No.: 09/092,475

(22) Filed: Sep. 25, 1998

(51) Int. Cl.[7] .................................................. G02F 1/15
(52) U.S. Cl. ........................ 359/265; 359/270; 359/274
(58) Field of Search ................................ 359/265, 268, 359/269, 270, 275, 241, 274, 273; 353/42; 345/179–183

(56) References Cited

U.S. PATENT DOCUMENTS

| | | | |
|---|---|---|---|
| 3,986,771 A | 10/1976 | Tsukada | 355/3 R |
| 4,019,809 A | 4/1977 | Otake et al. | 350/160 R |
| 4,053,209 A | 10/1977 | Hara et al. | 350/160 R |
| 4,150,876 A | 4/1979 | Yevick | 350/338 |
| 4,324,622 A | 4/1982 | Deb | 430/63 |
| 4,500,174 A | 2/1985 | Conner | 350/357 |
| 4,596,722 A | 6/1986 | Warszawski | 427/108 |
| 5,069,535 A | * 12/1991 | Baucke et al. | 359/273 |
| 5,220,445 A | * 6/1993 | Takenaka et al. | 349/30 |
| 5,377,037 A | 12/1994 | Branz et al. | 359/265 |
| 5,500,491 A | * 3/1996 | Watanabe | 178/18.09 |
| 5,541,762 A | 7/1996 | Levy | 359/240 |
| 5,604,626 A | * 2/1997 | Teowee et al. | 359/265 |
| 5,784,129 A | * 7/1998 | Konuma et al. | 348/739 |

* cited by examiner

Primary Examiner—Hung Xuan Dang
Assistant Examiner—Tuyen Tra
(74) Attorney, Agent, or Firm—Paul J. White

(57) ABSTRACT

A display and projection apparatus includes an electrochromic material and a photoconductive material deposited in tandem used in conjunction with a light filtering means for filtering light transmitted through the electrochromic material. When an electric field is applied across the electrochromic material and the photoconductive material, light that is incident onto the photoconductive material through the surface of the projection apparatus causes the photoconductive material to conduct current locally in proportion to the amount of light incident on the photoconductive material. The flow of current causes the underlying portions of the electrochromic material to switch from an opaque state to a clear or transmissive state, thereby allowing back-light to propagate through the electrochromic material to create a visible image on the surface of the projection apparatus. Reversal of the electric field causes the electrochromic material to revert back to its opaque state, thereby blocking the transmission of back-light and effectively erasing the image from the surface of the projection apparatus.

17 Claims, 8 Drawing Sheets

ELECTROCHROMIC PROJECTION AND WRITING DEVICE

CONTRACTUAL ORIGIN OF THE INVENTION

The United States Government has rights in this invention under Contract No. DE-AC36-83CH10093 between the U.S. Department of Energy and the National Renewable Energy Laboratory, a Division of Midwest Research Institute.

BACKGROUND OF THE INVENTION

1. Field of Invention

The present invention relates to an information display device, and more particularly to an electrochromic device for inscribing and projecting or displaying images.

2. Description of the State of the Art

The use of overhead projection units or "projectors" and/or chalkboards are just two of the many devices available for conveying information visually to large audiences. Projectors are often used to project information appearing on transparent slides, foils, or "transparencies" onto a screen or wall. In using conventional overhead projection units, the transparency to be written on or containing the information to be projected is simply placed on the stage and is typically projected as a dark image on a light background. However, if the transparency does not lie flat on the stage of the overhead projector, the resultant enlargement of the information being projected may be distorted or may not be in focus. Furthermore, the transparency may be slippery, so when the projector is positioned in a manner with the stage slanted, the transparency may have to be held manually to prevent it from slipping in relation to the stage. Care also must be taken in the manner in which transparencies are handled, because ink from the markers that are typically used for writing on transparencies tend to smear easily.

To address the disadvantages that are common to transparencies, flat display panels are commonly used to display computer generated and other video information. Flat display panels are frequently used in direct-view applications, such as with laptop-style personal computers and are also used in projection display applications, such as overhead projection display panels that operate with conventional overhead projector light sources.

Projection display panels usually have liquid crystal displays and are typically coupled to personal computers that provide the graphic information to be projected for viewing. Despite the generally portable configurations of many projection display panels and laptop-style personal computers, they are quite expensive, and they can sometimes be inconvenient for individuals to transport and operate alone. Furthermore, liquid crystal displays suffer from the disadvantages of being operational in only a limited temperature range, and they have substantially no memory.

The disadvantages associated with chalkboards are primarily two-fold. First, lighting is essential for both presenters and viewers. Therefore, if a slide presentation is being made with the lights off to enhance viewing of the slide images, it is necessary to turn the lights back on before a chalkboard is used. Second, chalk is an irritant for some people, so those individuals who are prone to allergic reactions from chalk are not able to come into contact with chalk or chalk dust without suffering some negative physical effects. While "grease boards" are now common alternatives to chalkboards, they also require sufficient lighting to enable a viewer to see and read any information written on the board.

There have been some apparatus and methods developed for storing and reproducing images using electrochromic devices, since electrochronic materials afford the significant advantages of memory and reduced power consumption over other types of displays, such as liquid crystals. Such electrochromic devices employ an electrochromic material, which is responsive to the application of an electrical current of a given polarity to induce the material to undergo a change from a first persistent state that is transparent or bleached, in which the material is essentially non-absorptive of electromagnetic radiation, to a second persistent state in which the material absorbs electromagnetic radiation and darkens to a colored state, typically blue. For example, U.S. Pat. No. 4,500,174 to Conner discloses an electrochromic imaging apparatus utilizing electrochromic iridium oxide and a thin film solid ionic conductor. The Tsukada patent U.S. Pat. No. 3,986,771 discloses a light imaging and reproducing device for storage and reproduction of original images comprising an information storage medium including a member having a photoconductive substance and an electrochromic substance wherein, the member is supported electrodes. The Tsukada device further includes illuminating means and a power source. The Otake et. al. patent, U.S. Pat. No. 4,019,809, discloses a display device that includes a layer of photoconductive material and a layer of electrochromic material between electrodes, which is usefull as an image converter for the spectrum from X-rays to infra-red and as a memory device. Conner, Tsukada, and Otake all teach the use of photoconductors with an electrochromic materials. However, both Otake and Tsukada only teach image conversion and storage of such images. Neither of these Otake and Tsukada devices project the image or are capable of real-time writing. Similarly, Conner does not teach how an image may be projected or have real-time writing capabilities, but, instead, teaches imaging a static image that is seen in reflection and not as a projection.

SUMMARY OF THE INVENTION

Accordingly, it is a general object of this invention to provide an electrochromic device for projecting or displaying images in real-time.

A more specific object of the present invention is to provide an electrochromic image display device which is capable of being back-lighted and transmitting selective portions of such back lighting through a panel to produce images inscribed on a front surface of the panel in real time.

Another specific object of the present invention is to provide an electrochromic device for projecting or displaying images wherein the image clarity remains stable over time.

Additional objects, advantages and novel features of this invention shall be set forth in part in the description that follows, and in part will become apparent to those skilled in the art upon examination of the following specification or may be learned by the practice of the invention. The objects and advantages of the invention may be realized and attained by means of the instrumentalities, combinations, and methods particularly pointed out in the appended claims.

To achieve the foregoing and other objects and in accordance with the purposes of the present invention, as embodied and broadly described therein, the apparatus of this invention may comprise a photoconductive device arranged in tandem with an electrochromic opacity device, a light source positioned behind the electrochromic opacity device, an inscribing light positioned movably in front of the photoconductive device, and a light filter positioned between the light source and the electrochromic opacity device. The method of the invention includes inscribing and projecting an image with the apparatus by directing an inscribing light beam on the photoconductive device and, if desired, moving the inscribing beam in relation to the photoconductive device to inscribe and project a desired image.

BRIEF DESCRIPTION OF THE DRAWINGS

The accompanying drawings, which are incorporated in and form a part of the specifications, illustrate the preferred embodiments of the present invention, and together with the description serve to explain the principles of the invention. In The Drawings

DETAILED DESCRIPTION OF THE PREFERRED EMBODIMENT

Figure 1:
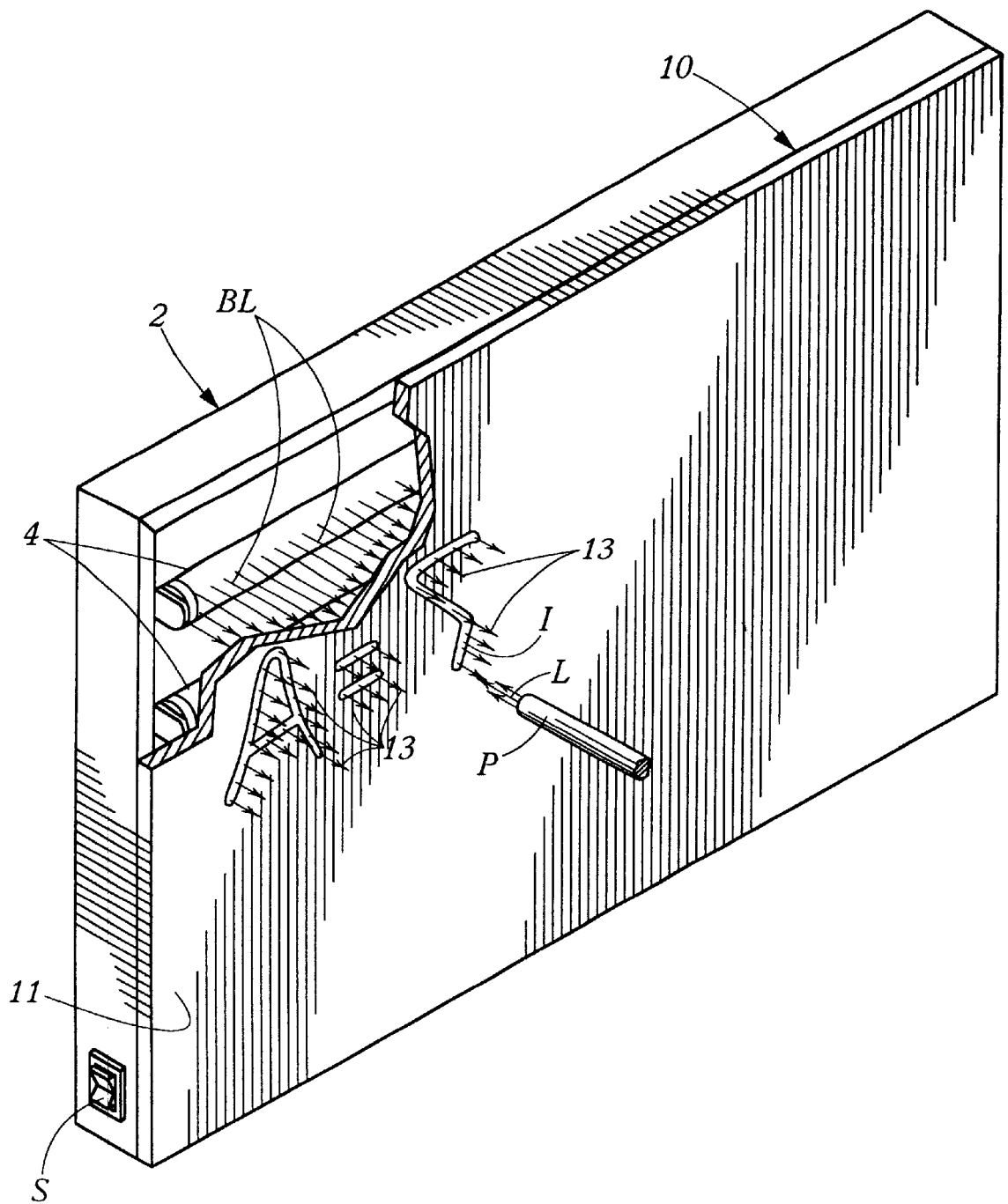
FIG. 1 is an isometric, diagrammatic view of an electrochromic image projection panel with a portion of the electrochromic device cut away to reveal back lighting, portions of which project through the electrochromic device in patterns of images inscribed on a front surface of the electrochromic device by light emanating from a pen light that is incident on the front surface of the electrochromic device according to this invention.

An electrochromic projection and writing device 10 according to the present invention is illustrated in FIG. 1 mounted in a panel assembly 2 with a back light BL source 4 and with a pen light P used to inscribe an image I on a front surface 11 of the electrochromic device 10. A light beam L emanating from the pen light P activates the electrochromic device 10 to transmit portions 13 of the front surface 11, as will be described in more detail below. A switch S is provided for actuating a change in the state of the photochromatic device 10 to block transmission of the portions 13 of back-light BL and thereby to effectively "erase" the image I from the surface 11, as will be discussed in more detail below.

Figure 2:
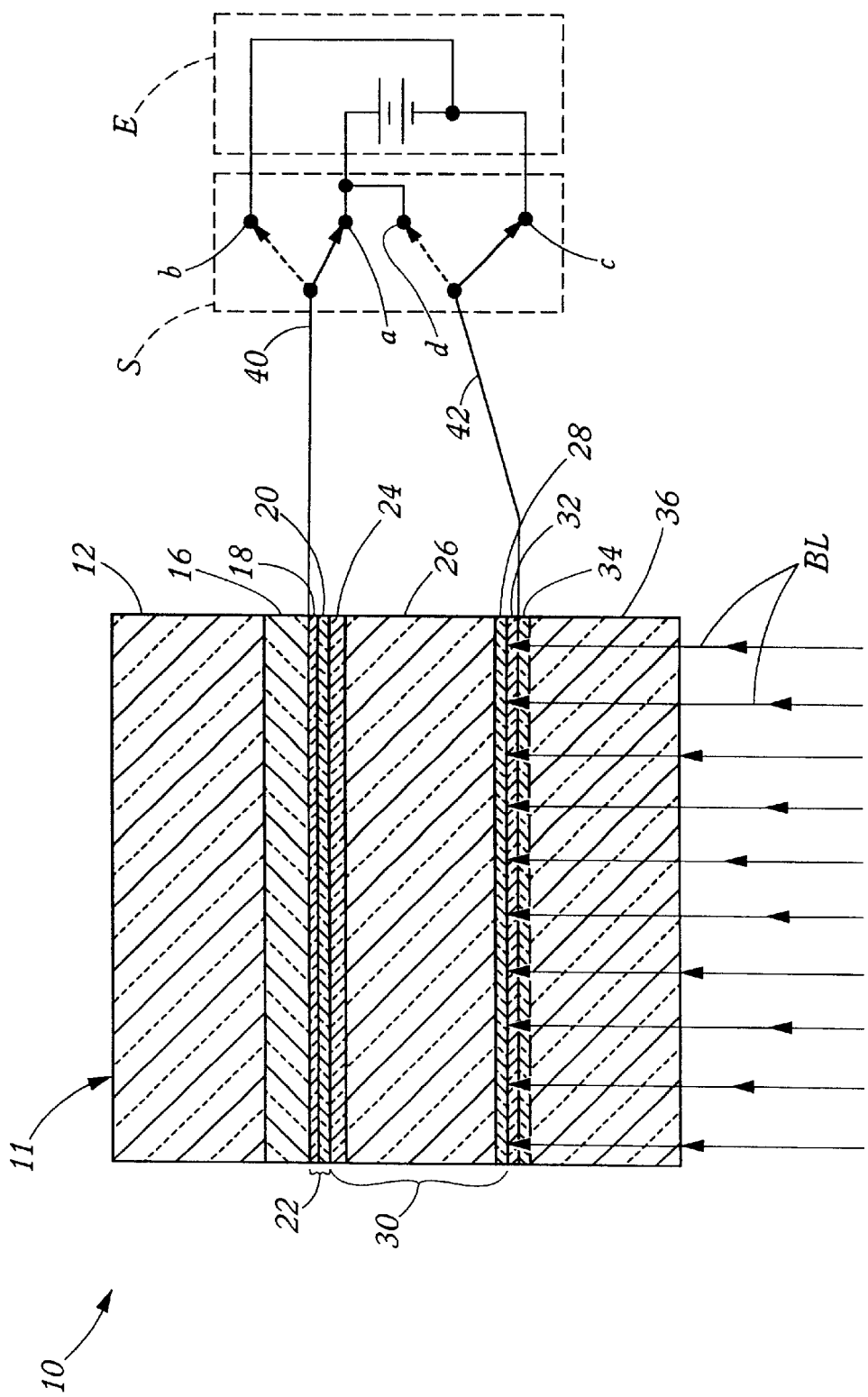
FIG. 2 is a cross-sectional view of a representative portion a first embodiment of the electrochromic projection and writing device of the present invention in a non-transmissive state.

Referring now to FIG. 2 in combination with FIG. 1, the electrochromic and writing device 10 of the present invention includes a solid state, thin-film structure electrochromic cell 30 sandwiched between two transparent substrates 12, 36. The electrochromic cell 30 includes a layer of electrochromic material, which can be transitioned between an opaque or colored state in which back-light BL is substantially blocked by the electrochromic material 28 and a bleached or transparent state in which back-light BL is transmitted through the electrochromic material 28 in response to changes in certain ion content. A thin-film, solid-state electrolyte or fast-ion conductor material 26 is interposed between the electrochromic material 28 and a layer of ion storage material 24. Upon application of a voltage to the electrochromic cell 30, a resulting electric current is conducted by ions, such as lithium ions ($Li^+$) or hydrogen ions ($H^+$), that are induced by the voltage to move between the ion storage material 24 and the electrochromic material 28. Voltage of one polarity across the electrochromic cell 30 causes such ions to move from the ion storage material 24 through the electrolyte material 26 to the electrochromic material 28, while voltage of the opposite polarity causes ion flow in the opposite direction from the electrochromic material 28 to the ion storage material 24. If the electrochromic material 28 is cathodic in nature, it reduces and takes on color or becomes opaque in response to ion insertion and bleaches or becomes transparent in response to ion depletion. Anodic electrochromic materials, on the other hand, bleach or become transparent in response to ion insertion and take on color or become opaque in response to ion depletion.

Voltage is applied across the electrochromic cell 30 by a power supply E connected by leads 40, 42 to respective transparent conducting electrode layers 16, 32 positioned on opposite sides of the electrochromic cell 30. However, a semiconductor, light-actuated half-diode 22, i.e., a diode with only one electrode 16, is positioned between the transparent electrode 16 and the ion storage material 24 to turn "on" the electric current in selected locations in response to exposure to light L emanating from the pen light L, as will be described in more detail below. Essentially, however, when the half-diode 22 is not exposed to the light L, as illustrated in FIG. 2, no current flows, thus ions do not move between the ion storage material 24 and the electrochromic material 28, even when a voltage is applied to electrodes 16 and 32. Therefore, in the non-transmissive state illustrated in FIG. 2, a voltage of one polarity is applied to electrodes 16, 32 across the electrochromic cell 30, but without light L from the pen light P incident on the half-diode 22, no current flows, thus no ions are transported, and the electrochromic material 28 remains colored or opaque, so the back-light BL is substantially blocked by the electrochromic layer 28 from being transmitted through the device 10.

Figure 3:
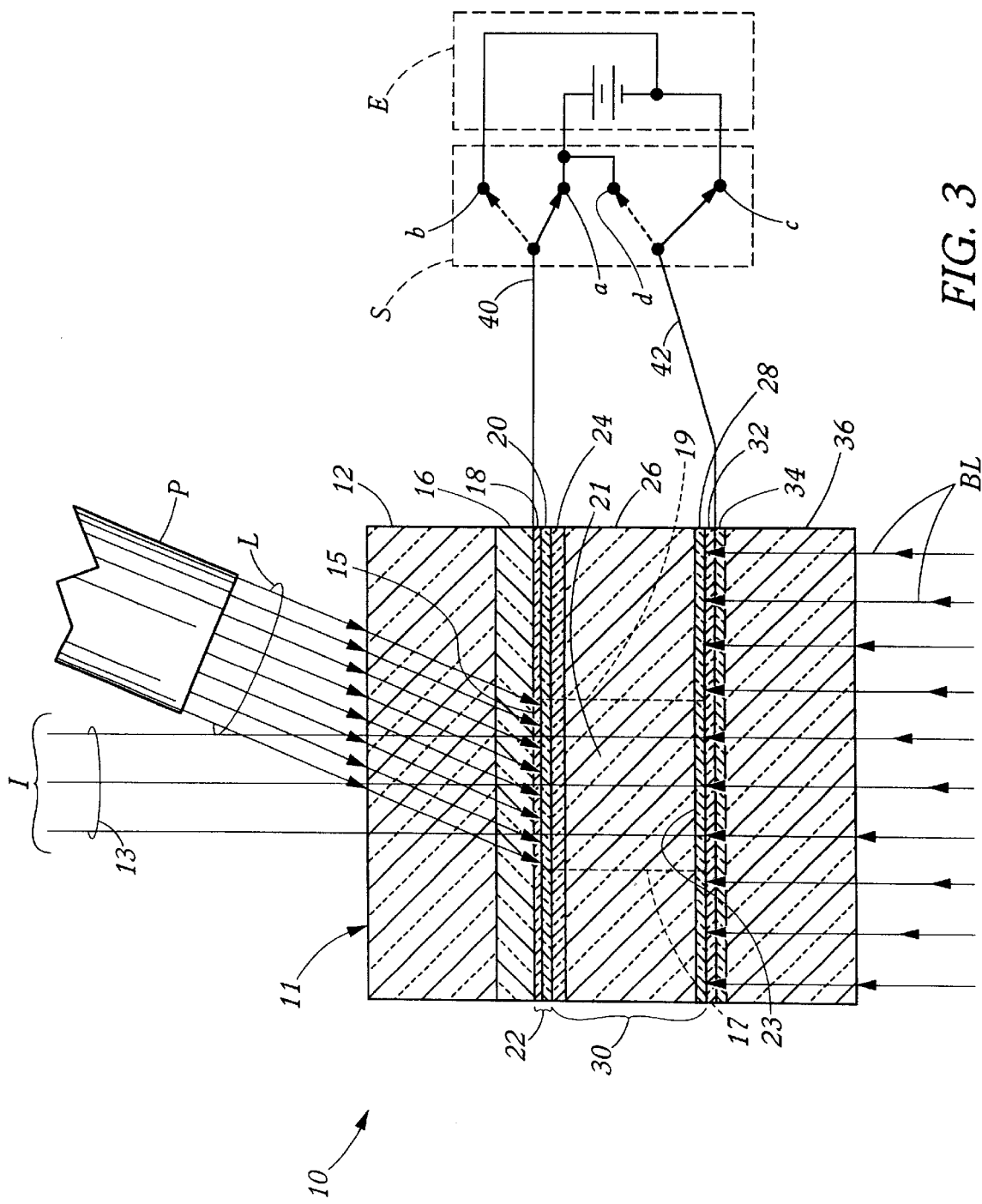
FIG. 3 is a cross-sectional view of the portion of the first embodiment of the electrochromic projection and writing device of FIG. 2, but in a transmissive state.

On the other hand, when light L from pen light P is incident on the half-diode 22 in the presence of a voltage applied to electrodes 16, 32, as illustrated in FIG. 3, the half-diode 22 is actuated in the area of incidence 15 to allow current to flow through that area of incidence 15 between the front electrode 16 and the back electrode 32 via ion flow in a volume 21 between phantom lines 17, 19 just under the area of incidence 15. This ion flow or transport in volume 21 causes a corresponding localized area 23 of the electrochromic layer 28 to bleach or become transparent, which allows the portion 13 of the back-light BL that is incident on the electrochromic layer 28 to transmit through the electrochromic layer 28 and through the top surface 11 to form the visual image I, as shown in FIG. 1 and described above.

Once the ions are removed from the localized area 23 of the electrochromic layer 28, if the electrochromic material 28 is cathodic, or inserted into the localized area 23, if the electrochromic material is anodic, to bleach the localized area 23 to transmit the back light portion 13, as described above, the light L from the pen light P can be removed or moved to a different location, and the localized area 23 of the electrochromic material 28 will continue to transmit the portion 13 of the back-light BL. The transmitted BL serves to make the PC conductive in area 15. Therefore, the visual image I formed by the light portion 13 that is transmitted through the localized area 23 of the electrochromic layer 28 remains, even when the light L is removed.

To erase the visual image I, something has to be done to reverse the positioning of ions in relation to the localized area 23 of the electrochromic layer 28 in order to reverse the localized area 23 to its colored or opaque state and thereby block transmission of the portion 13 of back light BL through the device 10. Such reversion can be accomplished by reversing polarity of the voltage applied to electrodes 16, 32, Actuation of the double pole, double throw switch S in the schematic diagram of FIG. 3 accomplishes such polarity reversal to erase the visual image I.

An electrochromic layer 28 is most likely not completely opaque and may transmit some amount of the back-light BL, typically blue light portions of the spectrum. Therefore, if blue wavelength light is absorbed by the half-diode 22, such blue light portions of the back light BL that is transmitted by the electrochromic layer 28 will actuate the half-diode to allow current to flow. The result will be to cause ion transfer throughout the entire electrolyte or fast-ion transfer material 26 and thereby bleach the entire electrochromic layer 28. Such large-area bleaching by transmitted back-light degrades the ability of the device 10 to display a sharp image I. A light filter layer 34 can be used to prevent such transmission of the portion of the back-light, such a blue, that is absorbable by the half-diode in order to prevent such large-area bleaching and enhance the back-light holding capacity of the electrochromic layer 28.

In use, the electrochromic projection and writing device 10 is initially set with the electrochromic layer 28 in an opaque state. Then, when an electric field of a first polarity, "the bleaching voltage," is applied across the front and rear electrodes 16 and 32, respectively, light L incident through the surface 11 of substrate 12 causes the half-diode device 22 to conduct current through the illuminated area 15 (shown in FIG. 3) in proportion to the intensity of light L that is incident on that area 15 of the half-diode device 22. The flow of current through the half-diode 22 causes the underlying area 23 of the electrochromic cell 30 to switch from the opaque state, as shown in FIG. 2, to a clear or transmissive state, as shown in FIG. 3, which allows the portion 13 of back-light BL to propagate through the electrochromic device 10 and be viewed on the surface 11 of substrate 12. This back-light BL also assists in further bleaching of the area 23 by causing continued electrical conduction through the illuminated area 15 of the half diode device 22, thereby increasing the writing speed of the device. Reversal of the electric field, as discussed in further detail below, causes the electrochromic layer 28 to revert back to its opaque state, thereby blocking the transmission of back-light BL and effectively "erasing" the visual image I on surface 11.

Figure 4:
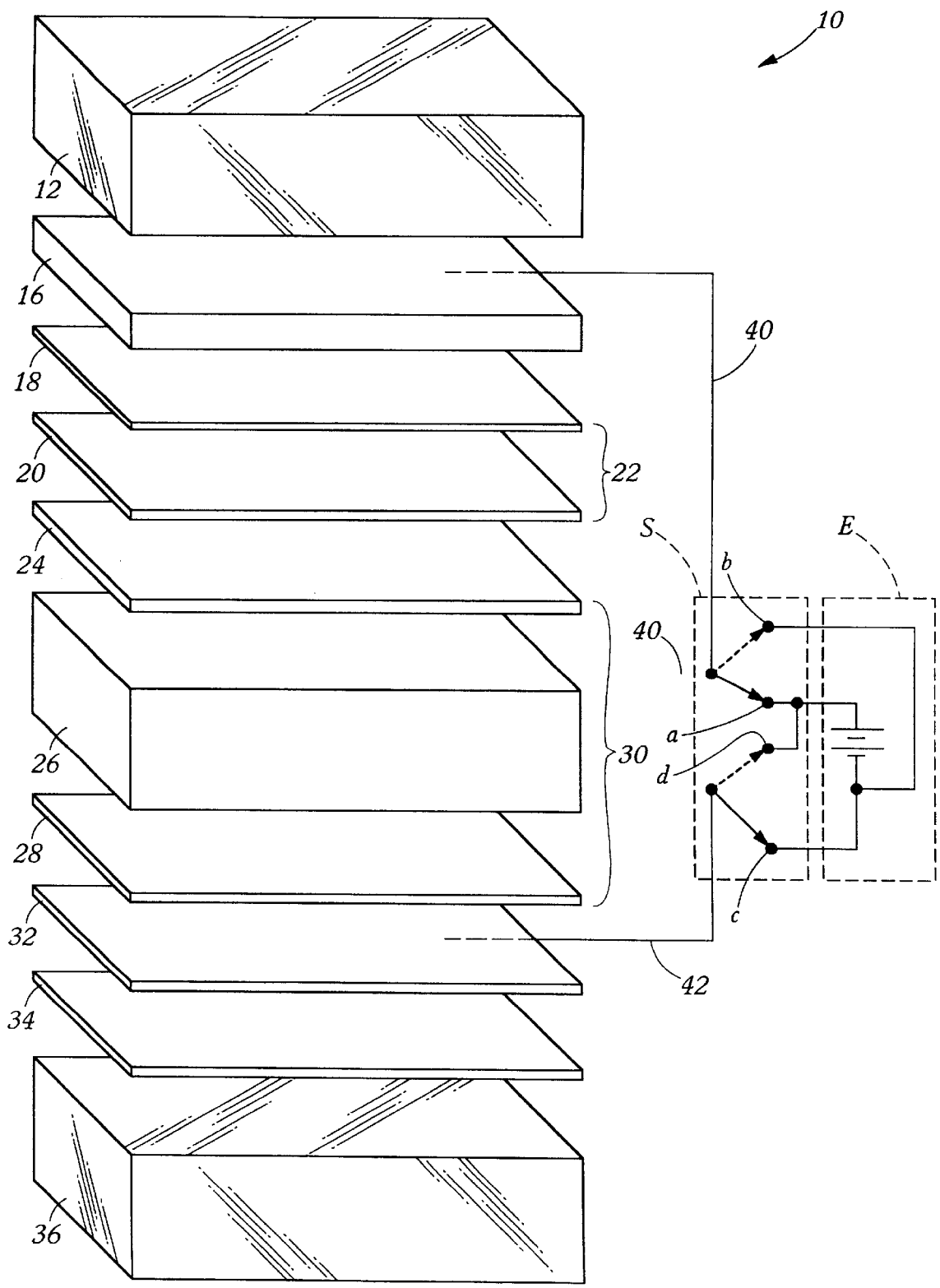
FIG. 4 is a partially schematic and partially isometric exploded view of a section of the first embodiment of the electrochromic device of the present invention illustrating the layered component structure.

Referring now primarily to FIG. 4, the electrochromic projection and writing device 10 according to the present invention includes the tandem deposition of a half-diode device 22 and an electrochromic cell 30 upon the surface 14 of a substrate 12. It is preferred that the half-diode device 22 should have asymmetrical current-voltage (I-V) characteristics to act like a photodiode so that bleaching current can flow only when the photodiode is activated by the light L, yet coloration current can flow even in the dark. A preferred structure for the half-diode with these characteristics is an amorphous silicon (a-Si) structure comprising a p-type layer 18 and an intrinsic (undoped) layer 20, although other half-diode devices may also suffice for purposes of this invention. One caution is that lateral current flow in the half-diode 22 structure should be avoided in order to create visual images that remain precise with sharp lateral edges over time. For example, referring to FIG. 3, localized current flow, thus ion transport, through the volume 21 bounded by phantom lines 17, 19, which align with the illuminated area 15 on the half-diode 22, results in bleaching localized area 23 of the electrochromic layer 28 in a size and shape that also corresponds in size and shape to the illuminated area 15. If some current would flow laterally in the half-diode structure 22, for example radially outward from the illuminated area 15, the boundaries 17, 19 of current flow, thus ion transport, through electrolyte 26 would also widen and blur, thus causing a corresponding widening and blurring of the bleached localized area 23 of the electrochromic layer 28, which in turn results in a widened and blurred visual image I. In this regard, it has been observed that a p-i half-diode of hydrogenated amorphous silicon may be superior to a palladium Pd/n– Schottky barrier, probably due to the more conductive n-layer of the Pd/n– Schottky barrier of the half-diode being positioned in contact with the ion storage layer 24. However, a structure with a thinner, or less heavily doped, n-layer, such as a p+/i/n– junction or a p+/n–/i device could also be used with minimal blurring or line spreading. Referring again to FIG. 4, the half-diode 22 layers 18, 20 and electrochromic cell 30 layers 24, 26, 28 can be deposited by physical vapor deposition, sputtering, chemical vapor deposition, i.e., heat stimulated or radio frequency discharge or the like. Substrate 12 may be formed in any desirable shape, from any optically transparent material for admitting light therethrough. Preferably glass, such as soda-lime glass, borosilicate glass, as well as transparent polymers may be employed in forming the substrate 12. In accordance with standard practice, the first layer deposited on surface 14 is a transparent electrically conductive (TE) layer 16. Transparent electrically conductive layer 16 may be made of highly doped metal oxides, such as tin oxide, zinc oxide, indium oxide, or mixtures thereof, or in the alternative the TE layer 16 may be made of thin transparent metals such as, Au, Ag or Cu; however, the use of thin transparent metals as opposed to doped metal oxides does not optimize transparency. This TE layer 16 is preferably about 300 nanometers thick, but can also be in the range of 100 to 5000 nanometers thick.

The p-i half-diode device 22, comprising layers 18 and 20 discussed in further detail below, is deposited over TE layer 16. Layers 18 and 20, which make up the p-i half diode device 22, may be formed from any partially transparent photoconductive materials such as a-SiC:H, a-SiO:H, or a-SiCO:H. Preferably a p-type hydrogenated amorphous silicon carbide [a-$Si_xC_{1-x}$:H(p) wherein x is in the range of about 0.1 to 0.3] or p-type microcrystalline silicon layer 18, in the range of 10 to 100 nanometers in thickness, and preferably about 10 nanometers thick is then deposited upon the TE layer 16 followed by an a-SiC:H(i) or undoped layer 20 on the order of 50 to 500 nanometers thick, and preferably about 40 nanometers thick.

An electrochromic cell 30, comprised of several component coatings, is next deposited over the half-diode device 22, and specifically over the a-SiC:H(i) layer 20, as shown in FIG. 4. The electrochromic cell 30 component coatings or layers, include an ion storage layer or counter-electrode layer 24, an ion-conductive-electrolyte or fast-ion transport layer 26, and an electrochromic layer 28.

Generally, the electrochromic cell 30 can be deposited one layer at a time utilizing the same deposition technique used in depositing the half-diode device 22. The first layer of electrochromic cell 30, which is deposited on the a-SIC:H(i) layer 20, is the ion storage or counter-electrode layer 24. The function of the counter-electrode layer 24 is to store ions that are retrieved from the electrochromic layer 28. However, it is important for this ion storage layer 24 to be formed using a material of low conductivity to prevent spreading of the image I in a similar mechanism as described above for the adjacent half-diode layer 20. This ion storage layer 24 is preferably about 250 nanometers thick and is preferably comprised of vanadium oxide ($V_2O_5$); however, the thickness of this layer could be in the range of 50 to 500 nanometers and be chosen from other materials, such as, iridium oxide, nickel oxide, and tungsten doped nickel oxide or any other well-known counter electrode or anodic electrochromic material.

An ion-conductive electrolyte layer 26 can then be deposited over the ion storage layer 24. Electrolyte layer 26 can be a liquid, a polymer gel, or a solid film. For most applications, the liquid electrolyte is not practical. Polymer gels in which the polymer acts like a sponge to hold the liquid electrolyte may be practical when the polymer gel is also used as the bonding layer between two sheets of glass or two sheets of plastic onto which the other layers have been deposited. Typical polymer gels are made of polyethylene-oxide, polypropylene oxide or a silicone imbibed with a lithium salt solution, such as lithium perchlorate, dissolved in propylene carbonate. Solid thin-film electrolytes are made of so-called fast-ion conductor materials in which either lithium or hydrogen ions diffuse readily. Examples of such fast-ion conductor materials include $Li_3N$, $Li_2NH$, and $Li_{1-x}M_xTi_{2-x}(PO_4)_3$, where M represents another metal such as aluminum, chromium, gallium, or the like. In the preferred embodiment of the present invention the ion conductor layer 26 is formed as lithium-aluminum fluoride ($LiAlF_4$) having a thickness of approximately 1000 nanometers. The solid thin-film ion conductor layer 26 may be, for example, 100 to 1000 nanometers thick.

Next, the electrochromic layer 28 is deposited over the ion conductor layer 26. An electrochromic material is one that takes on or loses color, i.e., becomes opaque or transparent, in response to an electric current flowing therethrough. Electrochromic materials can be anodic or cathodic in nature. Cathodic-type materials, such as $WO_3$, $MoO_3$, $TiO_2$, $U_2O_5$, $Bi_2O_3$, $PbO_2$, and $CuO_x$, reduce and take on color in response to ion insertion, which can be induced by a DC electric current. This electrochromic layer 28 is normally chosen to be a cathodic material, preferably tungsten oxide ($WO_3$), and can be about 100 to 1,000 nanometers thick, preferably about 500 nanometers With the electrochromic cell 30 formed, the second transparent electrically conductive layer 32, which is preferably tin-doped indium oxide having a thickness of about 50 nanometers, is then deposited over the electrochromic layer 28. Finally, the second optically transparent substrate 36 is adhered to the second transparent electrically conductive layer 32, thus completing the electrochromic projection and writing assembly 10 by sandwiching the electrochromic cell 30 and the half-diode device 22 in tandem between substrates 12 and 36.

In the preferred embodiment of the electrochromic projection and writing device 10 of the present invention shown in FIGS. 2 and 4, a light filter layer 34 is also disposed between the second transparent electrically conductive layer 32 and the substrate 36 for the purposes of enhancing coloration stability of the electrochromic layer 28 in the presence of back-light BL, as discussed above. Light filter 34 can be formed, for example, but not for limitation, from either a-Si:H (with an optical band gap of about 1.7 eV), low-H a-Si:H (with an optical band gap of about 1.65 eV), or a-SiGe:H (with an optical band gap of about 1.5 eV) having a thickness of approximately 1 micrometer, which is effective for inhibiting further bleaching or spreading of the boundaries of the image I when the half-diode 22 and the electrochromic layer 28 are fabricated with the respective materials described above.

As shown schematically in FIG. 2, leads 40 and 42, which are attached in contact with electrically conductive layers 16 and 32, respectively, are connected to an electric source E via a double-pole double-throw switch S to provide the required electric potentials across the electrode layers 16, 32, which are preferably between 1 to about 10 V for the structures and materials described above. Electric source E may be a photovoltaic cell, battery, or a DC voltage power supply derived from a conventional 110 V or 220 V AC wall outlet. Leads 40 and 42 may be connected integrally by lithography or masking or they may be external. When the switch S connects contacts a and c with the electric source E so that the electrode 42 near the electrochromic layer 28 has a negative polarity, an electric current and resulting ion transport causes color development or opaqueness in the electrochromic layer 28, as described above. When the switch S is changed over to connect contacts b and d with electric source E, an electric current will flow in the opposite direction to produce the transparent condition of the electrochromic layer 28, but only where the reverse-biased half-diode 22 is illuminated by light L to allow such current flow, as described above.

In operation, switch S is set initially for writing or inscribing images I on the electrochromic device 10 by connecting contacts b and d with electric source E and thereby the voltage to electrodes 16 and 32. Then, when light L, which can be, for example, about 1 W/cm$^2$ intensity and which can be generated by a light pen P or other light emitting device, is used to write on the surface 11 of substrate 12, such light L is transmitted to the half-diode 22 where it is absorbed and causes the resistance of the half-diode device 22 to be reduced at the area 15 being irradiated. Consequently, bleaching is caused in the corresponding localized area 23 of electrochromic layer 28, as shown in FIG. 3 and described above, thereby allowing the portion 13 of the back-light BL to be transmitted through the electrochromic layer 28 and appear as an image I on the surface 11 in a pattern that corresponds to movement of the light pen P, as best seen in FIG. 1. A columated light beam L or laser will produce a more precise image I with sharper edges than a dispersed light, especially if the light source P has to be held at a significant distance from the electrochromic device 10. Erasure of this bleach-developed image I pattern is accomplished by changing the switch S to connect contacts a and c with the electric source E, whereby the original opaque state is restored in the electrochromic layer 28, as described above. This procedure for recording light image patterns on the electrochromic device 10 can be performed repeatedly.

Figure 8:
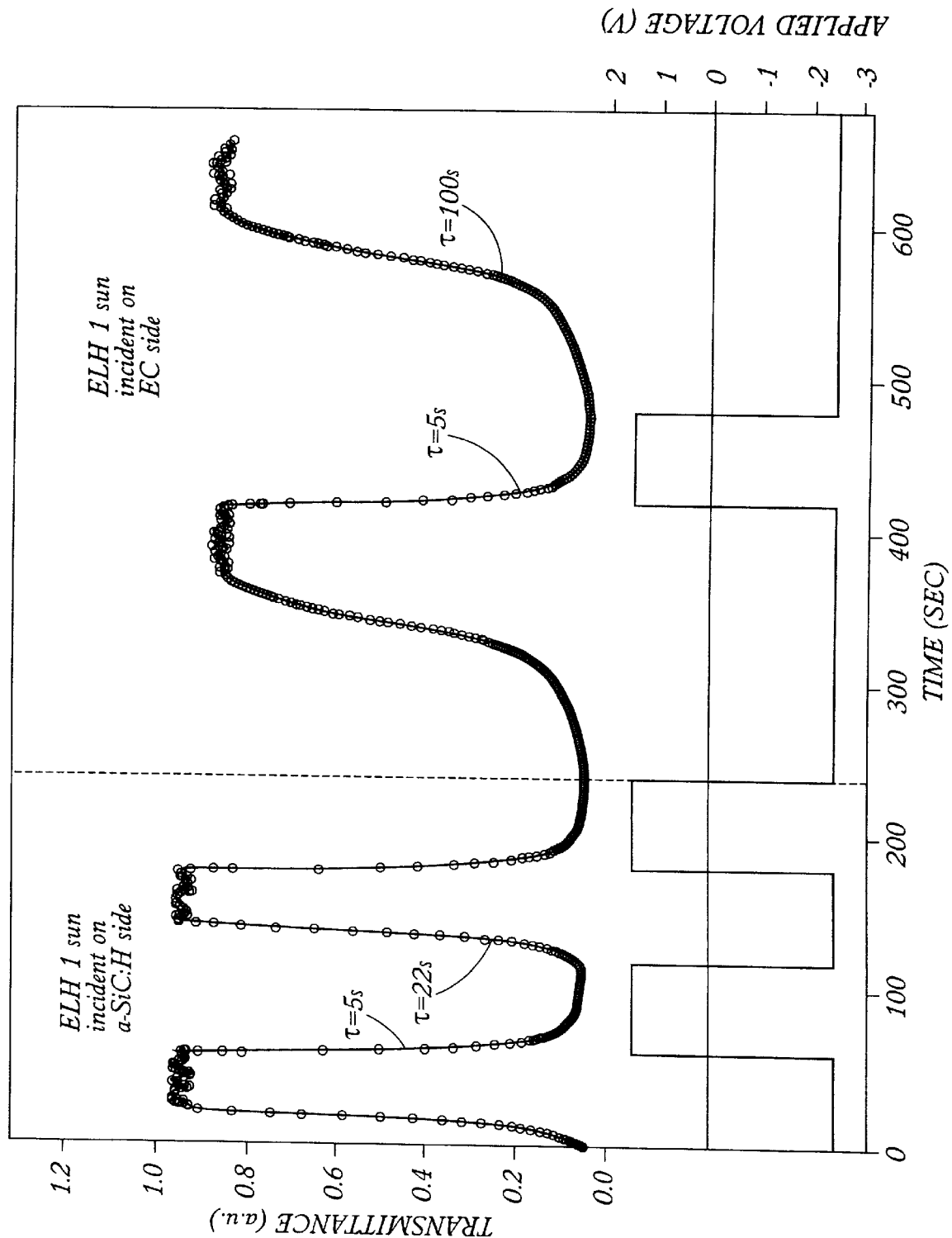
FIG. 8 is a graph of the relative transmittance change and response time of the electrochromic-photodiode film of the present invention using a tungsten halogen 1-sun white light as back illumination.

Example transmittance change and the current response time of the electrochromic projection and writing device 10 of the present invention is illustrated in FIG. 8. The light source P in this example is a tungsten-halogen projector lamp with an intensity of 1-sun white illumination from below, and a short circuited a-Si photo diode measured the light transmitted through an alternate embodiment of the electrochromic projection and writing device 10, which lacked filter 34. A 5×5 mm aperture was placed immediately below the electrochromic projection and writing device 10 (lacking filter 34) to give a precisely defined light on the electrochromic projection and writing device 10 (lacking filter 34). The electrochromic projection and writing device 10 (lacking filter 34) could be mounted either side up, simulating line writing when the light L struck the a-Si (front) side first or simulating color holding under back light conditions when the back-light struck the electrochromic (back) side first.

Particularly for the color holding test of this example, the light L was incident only on the electrochromic (back) side and no stray light was incident on the a-Si (front) side of the electrochromic device 10, because the half-diode 22 made from a-SiC:H was very photosensitive. Several modifications to the electrochromic projection and writing test set-up were required to make this so. First, the entire sample stage and photo detector were shrouded in black felt cloth. Second, the photo diode used for measuring light transmitted through the electrochromic device 10 was mounted at an angle so that light would not be reflected back onto the a-Si (front) side of the electrochromic projection and writing device 10. Third, an additional small aperture was placed in the path of the back lighting lamp to illuminate only the final aperture, not the entire bottom of the electrochromic projection and writing device 10 stage, to prevent reflected light from entering the shroud at oblique angles through the final aperture. The response time for changes in transmission of light through the electrochromic projection and writing device 10 as the light is turned on and off, which demonstrates the principles of this invention, is shown in FIG. 8. The effect of changing the switch S connection from a and c (positive voltage) to b and d (negative voltage) and the effect of light incident from surface 11 (a-SiC:H) and from the surface of layer 36 are also shown in FIG. 8. Further decrease of the bleaching response time is achievable with the use of a more intense light incident on surface 11. Further increase of the bleaching response time for light incident on the electrochromic layer 36 may be achievable with the use of materials different from those used in this example on the electrochromic cell 30 of the device 10.

Figure 5:
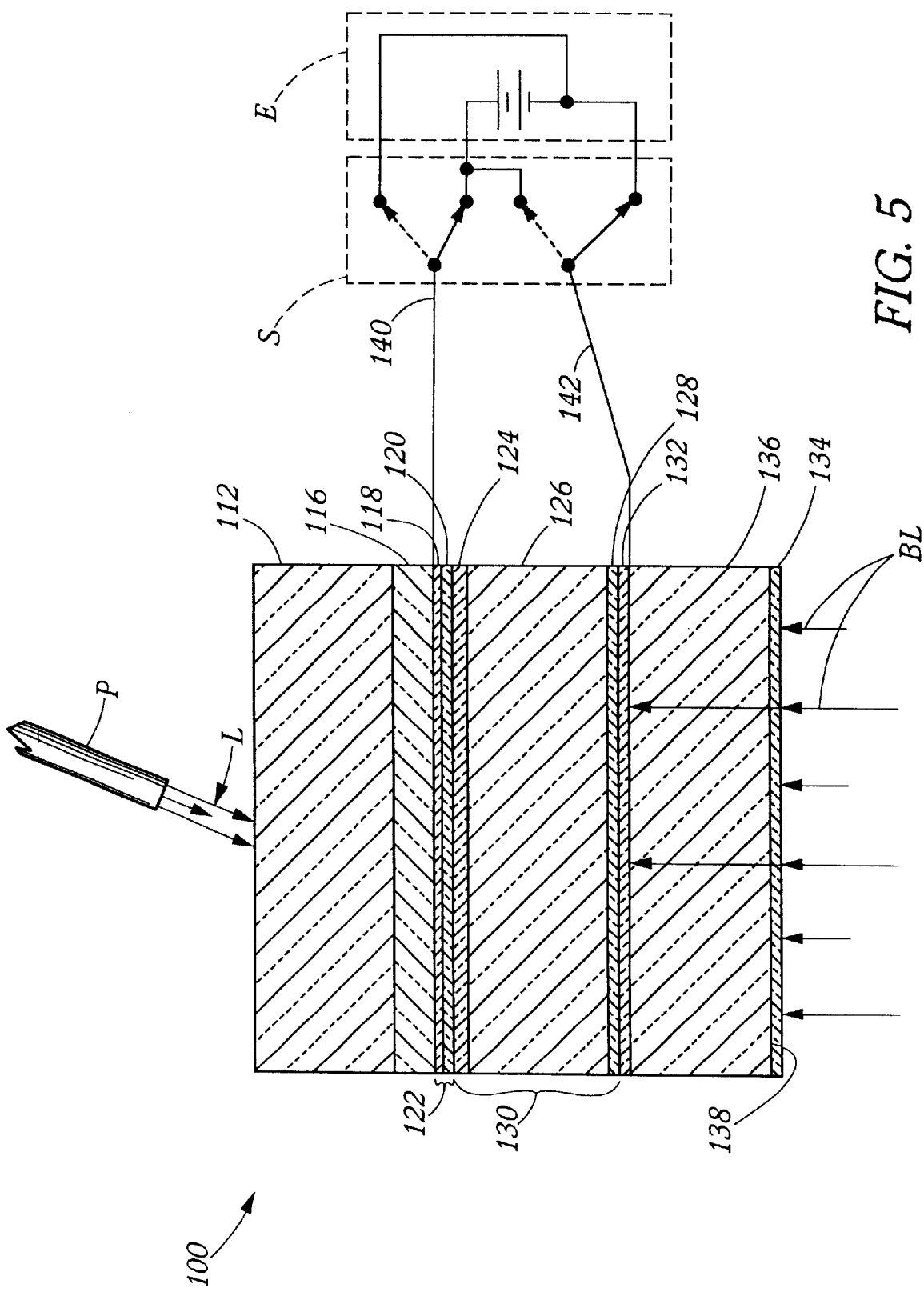
FIG. 5 is a cross-sectional view of a representative portion of a second embodiment of the electrochromic projection and writing device of the present invention in a non-transmissive state.
Figure 6:
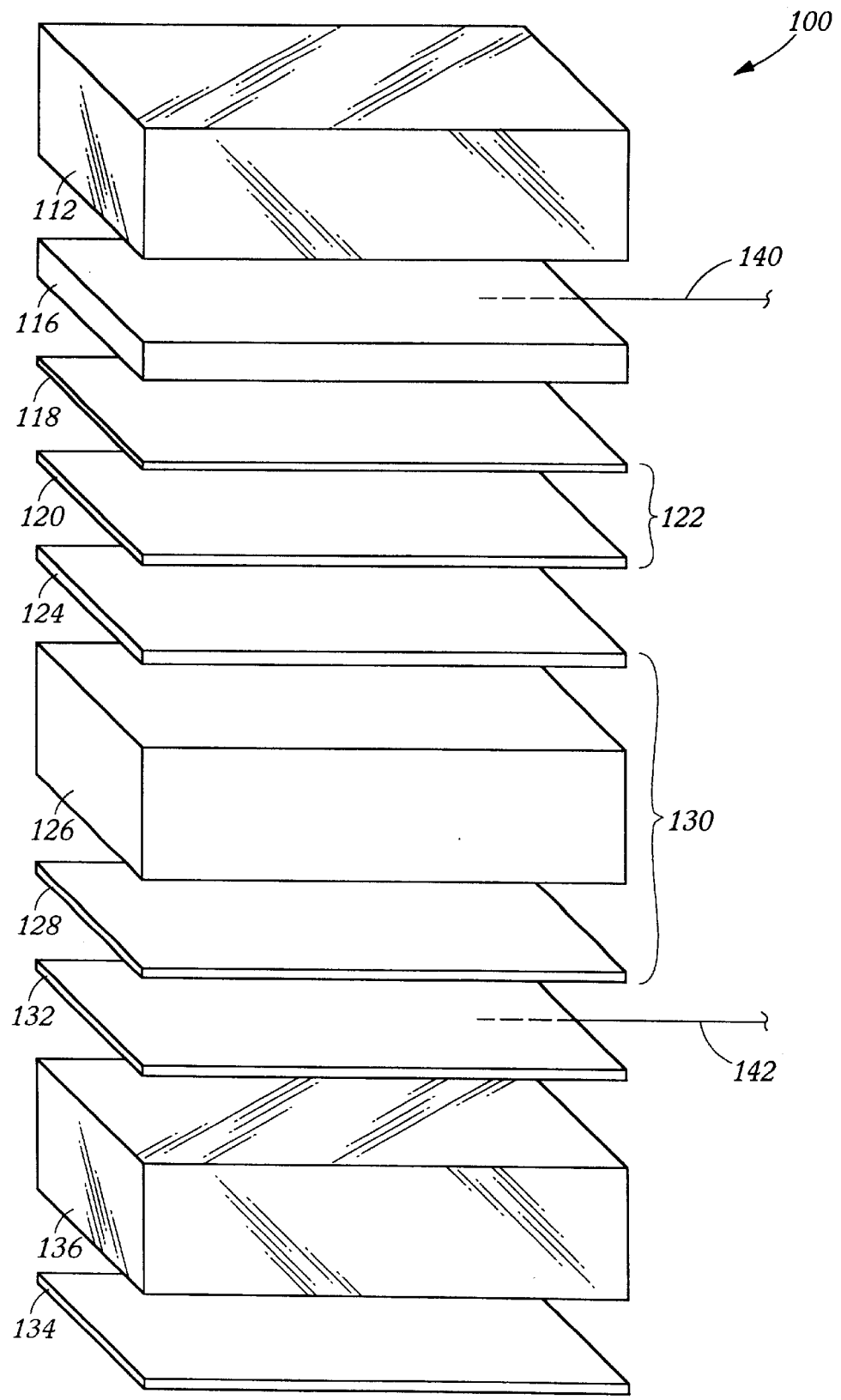
FIG. 6 is a partially schematic and partially isometric exploded view of a section of the second embodiment of the present invention.

An alternate embodiment 100 of the electrochromic projection and writing device with a light filter 134 adhered to the outside surface 138 of substrate 136 is shown in FIGS. 5 and 6.

Figure 7:
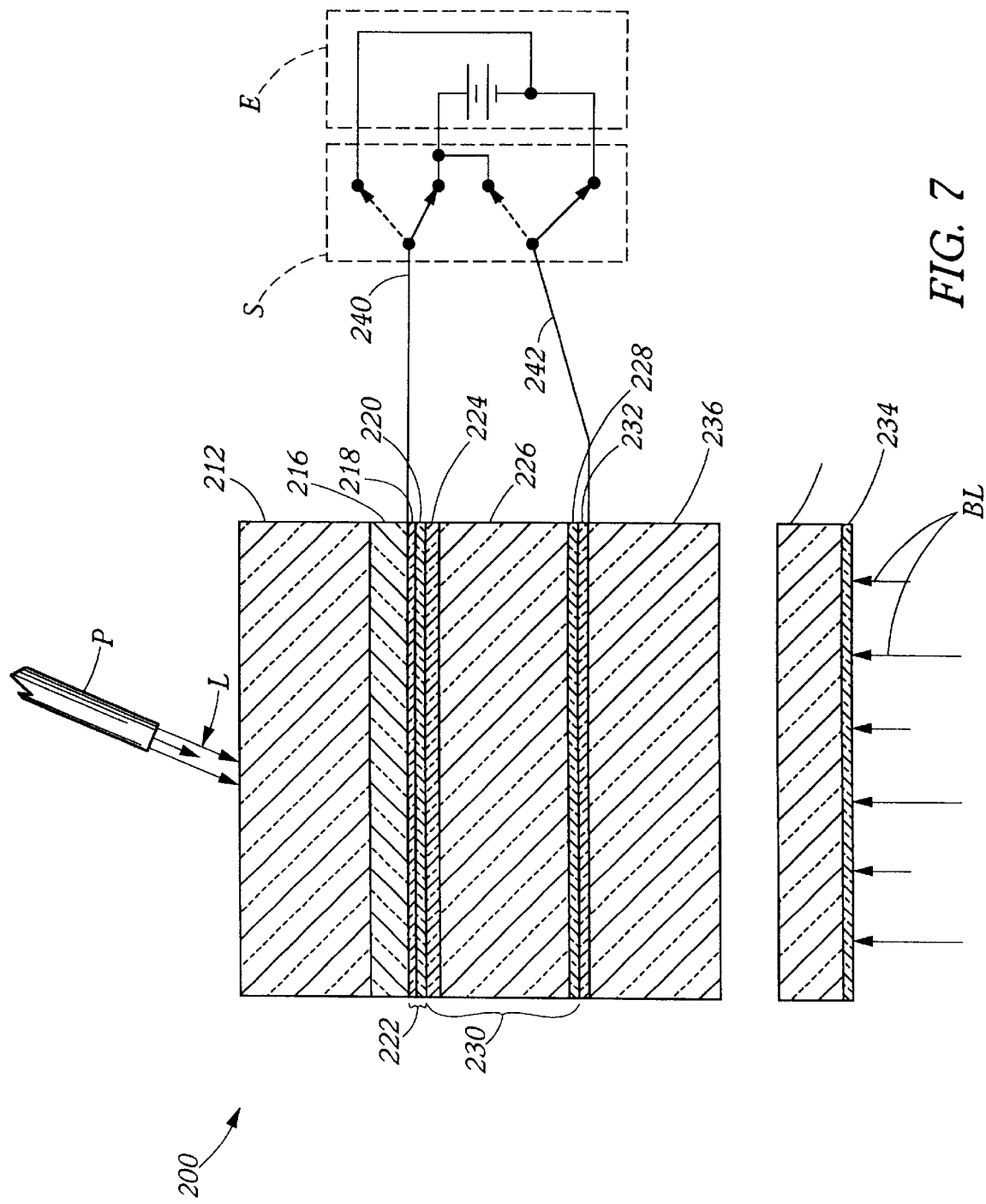
FIG. 7 is a cross-sectional view of a representative portion of a third embodiment of the electrochromic projection and writing device of the present invention in a non-transmissive state.

In a third embodiment, shown in FIG. 7, the electrochromic projection and writing device 200 is assembled as described above, but without a light filter incorporated in the device 200 structure. However, the electrochromic projection and writing device 200 is used in conjunction with a back-light source that is equipped with a light filter 234 to provide essentially the same functions and benefits as the light filters that are included in the embodiments described above.

The foregoing description is considered as illustrative only of the principles of the invention. Further, since numerous modifications and changes will readily occur to those skilled in the art, it is not desired to limit the invention to the exact construction and process shown as described above. Accordingly, all suitable modifications and equivalents may be resorted to falling within the scope of the invention as defined by the claims which follow.

The embodiments of the invention in which an exclusive property or privilege is claimed are defined as follows:

1. Image projection and writing apparatus, comprising:
    an electrochromic cell comprising an electrolyte positioned between an electrochromic material and an ion storage material, said electrochromic cell being positioned between a transparent front electrode and a transparent back electrode, said front electrode and said back electrode being connected to a voltage source in a manner that applies a voltage across said electrochromic cell,
    a photodiode positioned between the front electrode and the electrochromic cell, said photodiode having electrical resistance that varies in response to light;
    a back light source positioned adjacent said back electrode; and
    an inscribing light source positioned adjacent said front electrode.

2. The image projection and writing apparatus of clam 1, wherein said photodiode has a total light-absorbing area and said inscribing light source has a light beam that is directed onto an incident area on said photodiode that is smaller than said total light absorbing area.

3. The image projection and writing apparatus of claim 2, wherein said inscribing light source is moveable in relation to said photodiode.

4. The image projection and writing apparatus of claim 1, wherein said electrochromic material has a colorized state that is substantially opaque to light produced by said back light source that is outside of a wavelength band range while being transmissive of at least some light produced by said back light source that is within said wavelength band range, and wherein said image projection and writing apparatus includes a light filter positioned between said back light source and said electrochromic material, said light filter being substantially opaque to light in said wavelength band range.

5. The image projection and writing apparatus of claim 1, wherein said photodiode has decreasing electrical resistance in response to increasing light intensity in a characteristic wavelength band, and wherein said image and writing apparatus includes a light filter positioned between said back light source and said photodiode, which light filter is substantially opaque to light in said characteristic wavelength band.

6. The image projection and writing apparatus of claim 1, wherein said photodiode is a half-diode and is positioned in contact with said ion storage material.

7. The image projection and writing apparatus of claim 6, wherein said half-diode is a p-i semiconductor device.

8. The image projection and writing apparatus of claim 6, wherein said half-diode is a p+/n–/i semiconductor device.

9. The image projection and writing apparatus of claim 6, wherein said half-diode is a p+/n–/i semiconductor device.

10. The image projection and writing apparatus of claim 1, wherein said front electrode and said back electrode are connected to said voltage source in a reversible manner such that polarity of voltage applied across said electrochromic cell is reversible.

11. A method of writing and projecting an image, comprising the steps of:
    positioning an electrochromic cell between a transparent front electrode and a transparent back electrode with a photodiode that has a decreasing electrical resistance in response to incident light of increasing intensity interposed between the front electrode and the electrochromic cell;

applying a bleaching voltage to said front electrode and said back electrode across said electrochromic cell;

directing a back-light through said back electrode onto said electrochromic cell; and directing an inscribing light beam through the front electrode and onto a portion of the photodiode to decrease electrical resistance of said portion of the photodiode and thereby allow electric current to flow through said portion of the photodiode and through a portion of the electrochromic cell that is adjacent said portion of the photodiode.

12. The method of claim 11, including the step of moving the inscribing light beam in relation to the photodiode.

13. The method of claim 11, wherein said step of directing an inscribing light beam comprises directing an inscribing light beam onto an incident area of said photodiode, said incident area having an area smaller than a total light absorbing area of said photodiode.

14. The method of claim 11, further comprising the step of filtering said directed back-light.

15. The method of claim 14, wherein said step of filtering comprises inhibiting light transmission within a wavelength band range corresponding to a wavelength band range of said back light to which said electrochromic cell is at least partially transmissive.

16. The method of claim 14, wherein said step of filtering comprises inhibiting light transmission within a wavelength band range corresponding to a wavelength band range of said back light to which said photodiode has a decreasing electrical resistance.

17. The method of claim 11, further comprising the steps of:

directing at least a portion of said back light through a localized area of said electrochromic cell; and forming an image corresponding to said localized area of said electrochromic cell.

* * * * *